March 19, 1940.　　　　E. ALMDALE　　　　2,194,349
AUTOMOBILE FRAME
Original Filed Oct. 15, 1935　　2 Sheets-Sheet 1

INVENTOR
EINAR ALMDALE
BY
ATTORNEY

March 19, 1940.   E. ALMDALE   2,194,349
AUTOMOBILE FRAME
Original Filed Oct. 15, 1935   2 Sheets-Sheet 2
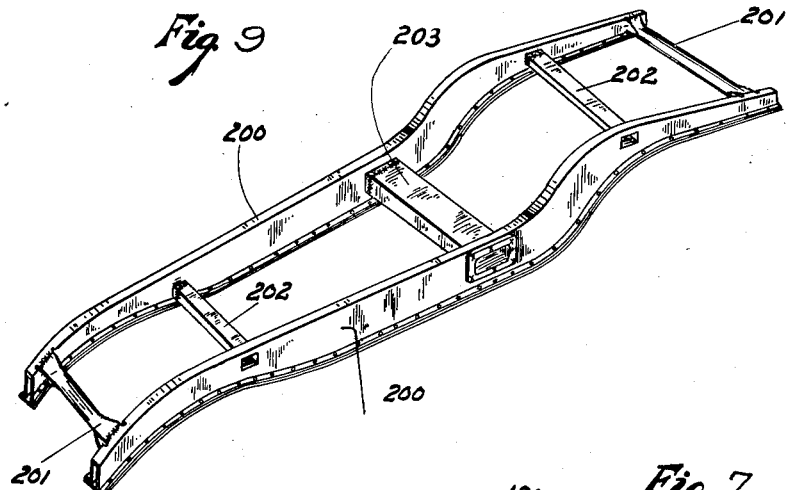
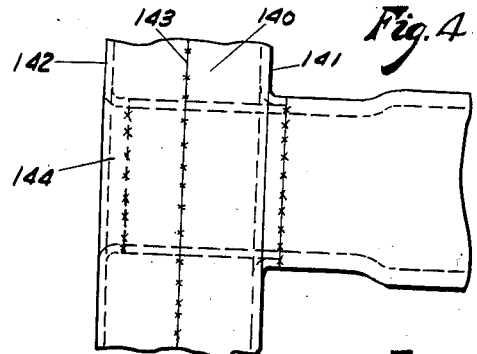
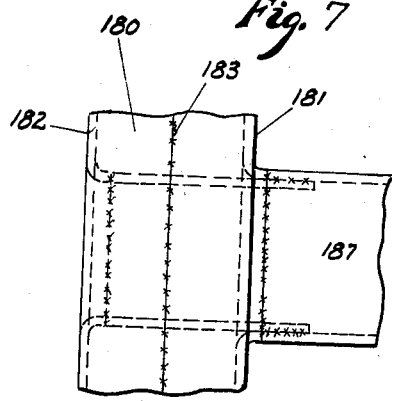
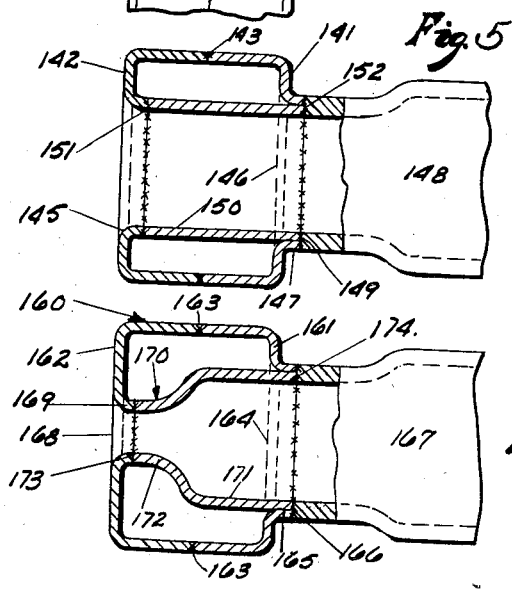
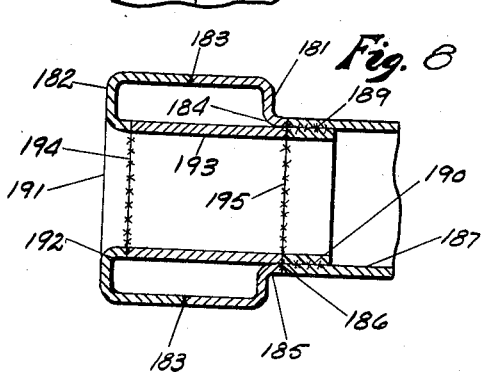
INVENTOR
EINAR ALMDALE
ATTORNEY Patented Mar. 19, 1940

2,194,349

UNITED STATES PATENT OFFICE 2,194,349

AUTOMOBILE FRAME

Einar Almdale, Detroit, Mich., assignor to The Midland Steel Products Company, Cleveland, Ohio, a corporation of Ohio Application October 15, 1935, Serial No. 45,065
Renewed February 13, 1939

8 Claims. (Cl. 280—106)

This invention relates to new and useful improvements in automobile frames, and an important object of the invention is to provide, during the blanking of side rails, means whereby cross members can be readily connected with the side rails after the latter have been formed in closed box section.

Another important object of the invention is to provide means for connecting transversely extending cross members to the side rails or longitudinally extending members, including structure wherein stress will be reduced or eliminated from the welded portions.

A further object of the invention is to provide the connected side rails and cross members with suitable complementary welding areas to effect proper distribution of heat therebetween during the welding operations.

Other objects and advantages of the invention will become apparent during the course of the following description.

Figure 1:
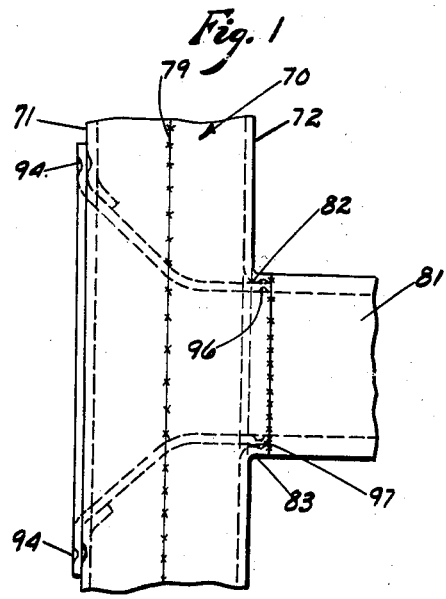
Figure 2:
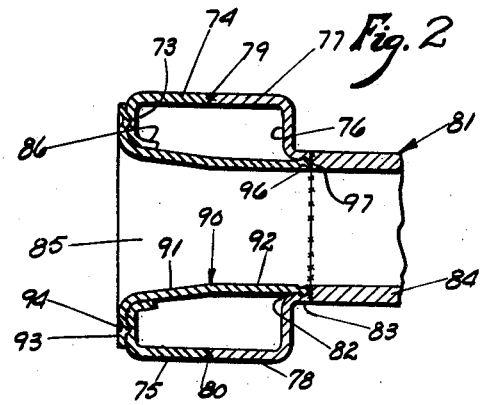
Figure 3:
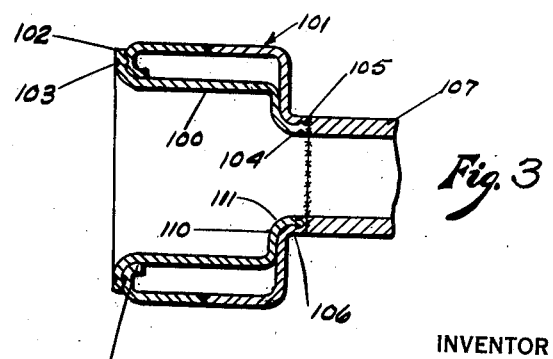

In the accompanying drawings forming a part of this application and wherein like numerals are employed to designate like parts throughout the several views:

Fig. 1 is a fragmentary plan view of an embodiment of the invention showing portions of a side rail and cross member, Fig. 2 is a fragmentary vertical sectional view of Fig. 1, Fig. 3 is a fragmentary vertical sectional view of a modified form of the embodiment shown in Fig. 1, Fig. 4 is a fragmentary plan view of another embodiment of the invention, showing portions of a side rail and cross member, Fig. 5 is a fragmentary vertical sectional view of Fig. 4, Fig. 6 is a fragmentary vertical sectional view of a modified form of the embodiment shown in Fig. 4, Figs. 7 and 8 are respectively fragmentary plan and vertical sectional views of another embodiment of the inventtion, and Fig. 9 is a perspective view of an automobile frame illustrating some of the embodiments shown in the foregoing figures.

Referring to Figs. 1 and 2, the numeral 70 designates a portion of a closed box section side rail, herein shown as comprising oppositely facing complementary channel sections 71 and 72, the outer channel 71 having a web portion 73, an upper flange 74 and a lower flange 75; and the inner channel section 72 having a web portion 76, an upper flange 77 and a lower flange 78. The complementary flanges of channel sections 71 and 72 extend toward each other and are adapted to be joined together as indicated at 79 and 80, preferably by butt welding the longitudinal edges of the flanges together whereby the web portions of the flanges are spaced apart to form a box section.

In order to weld a relatively heavy gauge cross member 81 to the side rail 70, the inner web portion 76 is punched out to form an opening 82, the defining walls of which terminate in a flange 83 extending outwardly of the side rail 70, and is butt welded to the adjacent extreme end of the cross member 81 from the outer periphery thereof to approximately the center of the wall 84 of the cross member 81. Since the gauge of the flange 83 is approximately one-half of the gauge of the cross member 81, the flange 83 will be coincident with about one-half of the thickness of the wall 84 of the cross member 81. The outer web portion 73 is also provided with an opening 85 defined by an annular flange 86 extending obliquely and inwardly of the side rail 70.

A stress transmitting member 90 is inserted in the side rail 70 through the openings 85 and 82, and is of tapered and polygonal cross section as respectively indicated at 91 and 92. The tapered section 91 terminates in an annular flange 93 which overlaps the outer surface of the outer web portion 73 and is suitably welded thereto, as by projection welding, and the tapered section 91 adjacent the flange 93 also bears against the annular flange 86 of the opening 85 and can be welded to the flanges 86 if so desired.

The extreme end of the polygonal section 92 is disposed in abutment with the remaining exposed end surface of the cross member 81 and is butt welded thereto. The outwardly extending flange 83 of the opening 82 bears against the polygonal surface of the member 90 and is herein shown secured together by projection welding.

A method of welding the frame elements together may comprise projection welding the annular flange 93 to the outer web portion 73 as shown at 94, then butt welding the longitudinal edges of the inner and outer channel sections, as indicated at 79 and 80, projection welding the member 90 and outwardly extending flange 83 as shown at 96, and finally butt welding the cross member 81 to the member 90 and flange 83 as shown at 97. These steps of welding need not be completed separately but may be combined, for example, the butt welds 79 and 80, and projection welds 96 may be performed at the same time.

The portion of the frame shown in Fig. 3 is generally similar to that shown in Figs. 1 and 2 with the exception of the configuration of the stress transmitting member 100 which extends transversely through a side rail 101 and terminates at one end in an annular flange 102 herein shown at 103 as projection welded to the side rail 101, and its opposite end 104 is reduced and is shown at 105 as projection welded to an annular flange 106 of side rail 101. The extreme ends of the annular flange 106 and the reduced end 104 are butt welded to a transverse cross member 107, and the combined gauges of the member 104 and flange 106 equal the gauge of the cross member 107.

In order to prevent distortion in the metallic structure of the frame during the welding of the same due to the high welding pressures and heat, I have provided the stress transmitting member 100 with a shoulder 110 which intimately bears against the side rail 101 as shown at 111. This construction bears the brunt of the welding pressures and also reduces the stress on the welded portions.

Referring to Figs. 4 and 5, the numeral 140 designates a closed box section side rail having inner and outer channel sections 141 and 142 butt welded together as shown at 143. The outer channel section 142 is provided with an opening 144 defined by an inwardly turned annular flange 145, and the inner channel section 141 has an opening 146 defined by an outwardly extending annular flange 147 which is butt welded as shown at 149 to the extreme end of a relatively heavy gauge transverse cross member 148. It will be noted that the gauge of the flange 147 is approximately one-half that of the cross member 148, and that the flange 147 is welded to substantially half the thickness of the cross member 148.

A stress transmitting member 150 extends transversely through the side rail 140 and one end thereof is butt welded, as shown at 151, to the inwardly extending flange 145, and the other extreme end is butt welded as indicated at 152 to the remaining exposed end surface of the cross member 148.

The portion of the frame shown in Fig. 6 is generally similar to the construction shown in Figs. 4 and 5. As shown in this embodiment the side rail 160 comprises inner and outer channel sections 161 and 162 butt welded together as shown at 163. The inner channel section 161 is provided with an opening 164 defined by an outwardly extending flange 165 butt welded, as shown at 166, to one half of the thickness of the end wall of a cross member 167. The outer channel section 162 is provided with an opening 168 considerably smaller than the opening 164 and is defined by an inwardly turned flange 169.

A stress transmitting member 170 is disposed transversely through the side rail 160 and has an enlarged section 171 and a reduced section 172, the extreme end of the latter being butt welded, as shown at 173, to the flange 169 and the enlarged section 171 being butt welded as indicated at 174 to the remaining uncovered surface of the cross member 167.

The opening 168 is smaller than the opening 164 to effect a proper distribution of the welding heat if the welds indicated at 163 and 173 are performed in one operation.

The embodiment of the invention illustrated in Figs. 7 and 8 comprises a box section side rail 180 having inner and outer channel sections 181 and 182 butt welded together as shown at 183. The inner channel section is provided with an opening 184 defined by an outwardly extending flange 185 to which is butt welded as shown at 186, the extreme end of a transverse cross member 187. Adjacent the extreme end of the cross member 187 and disposed concentrically and inwardly with respect thereto is a spacer 190 which is suitably strip welded as shown at 189 to the cross member 187.

The outer channel section 182 is also provided with an opening 191 defined by an inwardly disposed flange 192 the extreme end of which is butt welded as shown at 194 to an extreme end of a stress transmitting member 193, the other end of the latter being butt welded to the spacer 190 as indicated at 195.

By employing the spacer 190 the gauge of the cross member 187 can be relatively light, since the spacer 190 reduces the stresses on the welded portions at the end of the cross member 187; and in conjunction with the stress transmitting member 193 the torsional stresses are transmitted away from the cross member 187 to the four walls of the side rail 180.

Fig. 9 illustrates a frame employing some of the embodiments hereinbefore described. The side rails 200 are of hollow section of any desired construction, here shown as an inverted channel with a flat closing strip secured to the oppositely extending flanges thereof. The cross members 201 embody the features shown in a divisional application Serial No. 222,672 filed August 2, 1938; cross members 202 illustrate the embodiment shown in Figs. 4 through 8; and cross member 203 illustrates the application of the embodiment shown in Figs. 2 and 3. However, I do not limit the invention to the type of cross member at any particular location in the frame as the above is by way of example only, and the cross members may be interchanged according to requirements.

It will be understood that different types of welds may be employed aside from those specifically pointed out, and it will also be understood that various changes in the size, shape and arrangement of parts may be resorted to without departing from the spirit of the invention or the scope of the appended claims.

I claim:

1. In an automobile frame, a side rail of closed box-section having spaced apart inner and outer walls of relatively light gauge material, said inner wall having a flange, a cross member of relatively heavy gauge material, said flange being welded to one end of said cross member and covering only a portion of the same, and stress transmitting means extending transversely through the outer wall of said side rail and having its inner end thereof welded to the remaining uncovered end portion of said cross-member and having its outer end extended through and welded to said outer wall.

2. In an automobile frame, a side rail having spaced apart inner and outer side walls, each of said walls having a flange of relatively light gauge material, a cross member having an end substantially twice the thickness of said flange, said inner wall flange being welded to one end of said cross member and covering a portion of the same, and stress transmitting means extending transversely through said side rail and having one end thereof welded to the remaining uncovered end portion of said cross member and having its opposite end aligned with and butt welded to said outer wall flange.

3. In an automobile frame, a side rail having spaced apart inner and outer side walls, said inner wall having a flange of relatively light gauge material, a cross member having an end of substantially the same gauge as said flange and welded thereto, means for increasing the gauge of said cross member at said end, and stress transmitting means extending transversely through said side rail and welded to said gauge increasing means and to said outer side wall.

4. In an automobile frame, a side rail having spaced apart inner and outer side walls, a cross member welded to said inner wall, and means disposed transversely of each side rail and welded to said cross member and said outer wall, and said means having a pair of shoulders abutting against the inner and outer walls.

5. In an automobile frame, a side rail having spaced apart inner and outer side walls, and a tube having a flange at one end welded to the outer face of the outer wall and a shoulder adjacent the other end abutting the inner wall.

6. In an automobile frame, a tubular side rail having spaced apart inner and outer side walls, a cross member welded to said inner wall, and a tube having a flange at one end welded to the outer face of the outer wall and its inner end being in substantial alignment with the cross member.

7. In an automobile frame, a side rail having spaced apart inner and outer side walls, having registering apertures, a cross member for the frame welded to said inner wall around the aperture therein, and a tubular member having one end welded to the exterior face of said outer side wall around the aperture therein and extended through said aperture to the inside of the rail with its other end extending through the aperture in the inner wall and welded to said cross member.

8. In an automobile frame, a side rail having spaced apart inner and outer side walls provided with registering apertures, a cross member welded to said inner wall around said aperture, and a tubular member separate from the cross member secured to said outer wall around the aperture therein and having its other end provided with a shoulder abutting against said inner wall, and said shouldered end of said member extending through the aperture in the inner wall and welded to said cross member.

EINAR ALMDALE.